(12) United States Patent
Ivy

(10) Patent No.: US 10,711,482 B1
(45) Date of Patent: Jul. 14, 2020

(54) PORTABLE HUNTING BLIND

(71) Applicant: Eugene W. Ivy, Portland, OR (US)

(72) Inventor: Eugene W. Ivy, Portland, OR (US)

( * ) Notice: Subject to any disclaimer, the term of this patent is extended or adjusted under 35 U.S.C. 154(b) by 0 days.

(21) Appl. No.: 16/427,232

(22) Filed: May 30, 2019

(51) Int. Cl.
*E04H 15/00* (2006.01)
*A01M 31/02* (2006.01)
*E04H 15/34* (2006.01)
*E04H 15/62* (2006.01)

(52) U.S. Cl.
CPC ......... *E04H 15/001* (2013.01); *A01M 31/025* (2013.01); *E04H 15/34* (2013.01); *E04H 15/62* (2013.01)

(58) Field of Classification Search
CPC .............................. E04H 15/001; A01M 31/025
See application file for complete search history.

(56) References Cited

U.S. PATENT DOCUMENTS

| | | | | |
|---|---|---|---|---|
| 2,594,410 A * | 4/1952 | Feldpausch | ........... | A01M 31/00 135/141 |
| 2,771,088 A * | 11/1956 | Soldan | .................. | E04H 15/003 135/87 |
| 2,863,467 A * | 12/1958 | Hearell | ................. | E04H 15/003 52/2.17 |
| 3,540,170 A * | 11/1970 | Flowers | ................. | A01K 97/01 52/2.19 |
| 3,709,237 A * | 1/1973 | Smith | ................... | E04H 1/1244 135/87 |
| 3,913,598 A * | 10/1975 | Glutting, Jr. | .......... | E04H 1/1205 135/152 |
| 4,364,193 A * | 12/1982 | Visco | .................. | A01M 31/025 135/901 |
| 4,773,437 A * | 9/1988 | Glutting | ................ | E04H 15/001 135/117 |
| 5,630,439 A * | 5/1997 | Hutto | .................... | E04H 15/001 135/90 |
| 6,164,005 A * | 12/2000 | Copeland | ............ | A01M 31/025 135/901 |
| 7,980,166 B1 * | 7/2011 | Fuqua | ...................... | F41H 5/08 86/50 |
| 8,579,007 B2 * | 11/2013 | Pottmeyer | ........... | A01M 31/025 160/135 |
| 9,316,017 B1 * | 4/2016 | Slaughter | ............ | A01M 31/025 |
| 2006/0102216 A1 * | 5/2006 | You | ....................... | E04H 15/001 135/90 |
| 2015/0275540 A1 * | 10/2015 | Thomason | .......... | B29C 33/3857 135/117 |

* cited by examiner

*Primary Examiner* — Noah Chandler Hawk
(74) *Attorney, Agent, or Firm* — J. Douglas Wells

(57) ABSTRACT

A portable hunting blind having semi-rigid side material that is adapted to be supported in an upright orientation by a plurality of rod supports, sized and adapted to be positionable for concealing a hunter on all sides within an interior space, and having a top edge formed to include troughs of varying depths and shapes to provide improved camouflage and support for resting the barrel of a gun. The blind is very lightweight and is easily and rapidly deployable by unrolling the side material, orienting the sides into a closed shape, and pushing one or more of the rod supports downward to anchor the blind. An optional cover may be included for rain protection.

19 Claims, 16 Drawing Sheets

PORTABLE HUNTING BLIND

CROSS-REFERENCE TO RELATED APPLICATIONS

None.

BACKGROUND OF THE INVENTION

The technical field of invention relates to portable hunting blinds. More particularly, the present invention pertains to methods and designs for a highly portable, very lightweight, self-standing hunting blind.

Different designs for hunting blinds used for concealing a hunter from deer, ducks, coyote, turkey, and other game animals have been disclosed in various publications and products. The different designs provide various features and capabilities. Several portable deer blind designs comprise tent-like structure and materials, often using sewn panels of camouflage patterned thin polyester or nylon fabrics, mesh shoot-through window panels, and single-configuration tent-like interconnected poles. One such blind is the Ameristep Care Taker blind, which is a substantially square 2-person tent-like structure comprising a camouflage patterned thin fabric roof and sides with mesh windows over interconnected poles. The blind is set up in the same way a standard camping tent is set up. An internal construction of single-configuration/single-purpose interconnected tent-poles is opened within the polyester or nylon fabric shell or tent to create a single-purpose enclosed interior space within the blind. The blind is collapsed in the same way a standard camping tent is taken down. The single-purpose designed interconnected poles are collapsed, and the fabric material is folded up. When set up, the blind is approximately 69 inches tall and has foot print of approximately 60 by 60 inches. The blind weighs approximately 16 lbs.

Other designs comprise open-sided, uncovered ground blinds comprising a number of side panels that, when set up, provide concealment of the hunter to game only on one side, leaving the area behind the hunter exposed to the environment. One such blind is the Cut N Run 2-panel blind by Rhino Blinds, which comprises two panels approximately 56 inches in height that extend horizontally approximately 112 inches (when positioned fully open (or flat) at 180 degrees from one another). The panels comprise a fabric with window openings cut into them, along with interconnected poles to provide structure. The blind includes substantially straight side and top edges. The weight is approximately 8 lbs.

Another portable hunting blind is described in U.S. Pat. No. 8,579,007 by Pottmeyer et al., assigned to GhostBlind Industries, Inc. (hereinafter, GhostBlind). A version of the GhostBlind product comprising 4-panels, has a height of approximately 46 inches, a (flat or fully open) width of 102 inches, and a weight of approximately 8 lbs. The panels may be set up in a semi-circle or arch to provide concealment of the areas in front of the hunter and leaving the areas behind the hunter exposed. Each panel is rigid and incorporates a reflective exterior mirror finish for reflecting the exterior environment. The panels are intended to be set up with an outward angle so that the exterior surface of the panels reflect greater portions of the ground in front of the blind instead of potentially portions of sky. When set up, the blind comprises an open-sided, uncovered ground blind for providing concealment of the hunter to game only on one side. The blind may be collapsed by folding each of the panels together like leaves in a book, with the collapsed blind comprising a rigid stack of panels.

Each of the existing portable hunting blind designs has disadvantages in terms of cost, complexity of design, ease of use, feature content, method of recommended and actual use, form factor and ergonomics of the device, design aesthetics, and/or other factors. What is needed are designs for a portable hunting blind, that address one or more disadvantage of existing designs.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENTS

Figure 1:
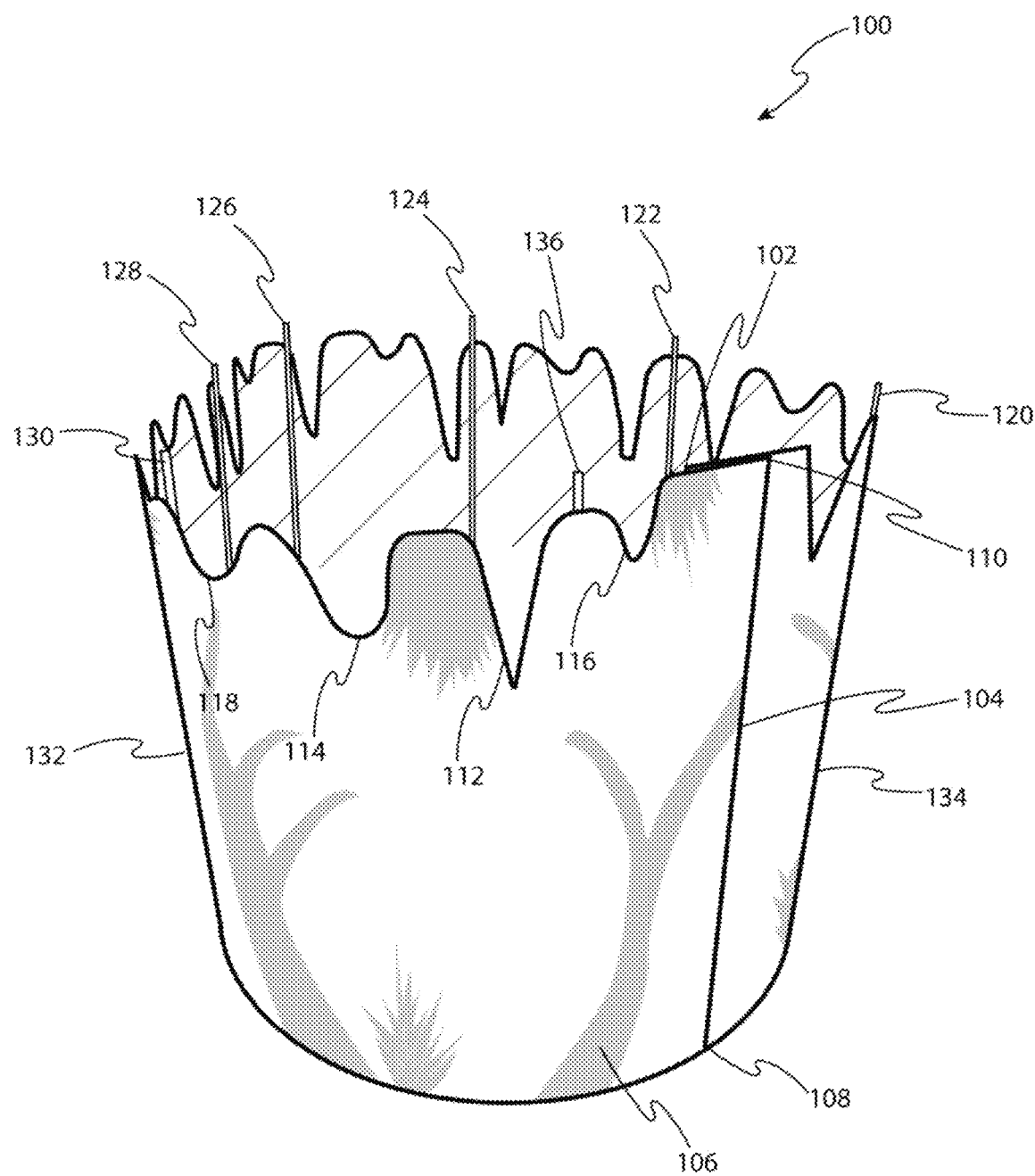
FIG. 1 is a perspective view of a portable hunting blind, according to preferred embodiments.

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

As an overview, preferred embodiments comprise a portable hunting blind having rollable semi-rigid side material adapted to be supported in an upright orientation by a plurality of rod supports, with the side material sized and adapted to be positioned to form a closed shape for concealing a hunter within an interior of the shape. The top edges of the side material is preferably formed to include troughs of varying depths and shapes to provide greater camouflage characteristics, provide positions for resting the barrel of a gun or other apparatus, and provide areas for visual line of sight for use by the hunter positioned within the interior of the blind. The side material is preferably comprised of semi-rigid material that can be easily cut with a knife but that does not easily rip once cut, so that a hunter may modify the top edge of the blind to create uniquely sized barrel rest shapes or additional through holes within the side material.

The blind is preferably sized to accommodate a hunter with chair, and enough room for a small heat source such as canned heat (fuel made from denatured and jellied alcohol), and an ozone generator or deodorizer. Preferred embodiments comprise side material having an approximate flat dimension of 4 feet in height by 12 feet in length, whereby the side material encloses a space having a perimeter of approximately 12 feet. The side material is preferably flexibly positionable into a (closeable) circle having a circumference of approximately 12 feet and diameter of approximately 3.8 feet, or any shape, by repositioning the plurality of support rods. The side material is further preferably adapted to allow for interconnected two or more blinds together to increase the perimeter and interior space of the (resulting, combined) blind.

Each of the support rods is preferably capable of being selectively adjusted downward to effectively stake a portion of the side material into the ground or surface beneath the blind. The blind further preferably includes a plurality of anchor receptacles through which standard tent stakes may be used to further secure a bottom edge of the blind side material.

Preferred embodiments further comprise an optional cover for rain protection and added camouflage from above.

Although the preferred embodiments may be described in the context of a portable hunting blind, each of the described innovations, among others described herein, are separable and may be applied in different combinations and to devices adapted for other, non-hunting blind applications.

Turning now to the figures, FIG. 1 is a perspective view of a portable hunting blind 100, according to preferred embodiments. The blind 100 preferably comprises a semi-rigid side material having an edge 104 at one end, the edge 104 having a top 110 and a bottom 108 that defines a height 108-110 of the sides of the blind 100, and extending to form a closed shape. In FIG. 1, the blind 100 comprises the side material formed into a substantially cylindrical orientation, with a width or diameter 132-134. Support rods 120, 122, 124, 126, 128, 130, and 136 are preferably equally spaced along the side material to provide structural support across the height 108-110 of the side material and to permit staking down the blind 100. The top edge of the blind 100 is preferably cut or formed with an irregular edge. As shown, the top edge of the blind 100 preferably incorporates cutouts and rounded edges such as a relatively shallow valley 116, a deeper vee cut 112, a deep U shaped trough 114, and a shallower U shaped trough 118.

The number and shape of the troughs and valleys may be different. However, the present inventor discovered that the blind 100 should incorporate multiple troughs and valleys cut into the top edge to reduce the amount of straight lines along the upper edge of the blind (thus improving camouflage characteristics of the blind) and to provide the hunter with multiple viewing ports and areas to rest the barrel of a gun, the end of a spotting scope, or other hunting apparatus. The side material preferably comprises semi-rigid with sufficient strength and resistance to deformation to support at least part of the weight of a gun barrel resting across a top edge of the side material, such as in one of the valleys, cuts, or troughs described herein. The present inventor further discovered that the side material should preferably comprise a semi-ridge material with enough strength to resist ripping in a V shaped trough such as vee cut 112, and resilient enough to allow for the hunter to cut a new or modified trough along the top edge, or even a through hole anywhere in the side material, without jeopardizing the structural integrity of the blind. The present inventor discovered that using a thin (approximately 5 mm thick) closed cell foam material, such as for example expanded polyethylene (or EPE) for the side material, provides advantageous side material characteristics for the top edge troughs and valleys (and for structural integrity of the blind as oriented and configures as shown in FIG. 1). The present inventor discovered that constructing the blind 100 substantially as shown in FIG. 1 and described herein, comprising a semi-rigid EPE side material, with support rods to provide added structure and that may be pushed downward to anchor the side material to a surface under the side material, and with optional additional stakes along a turned up lower edge of the blind, provides considerably robust wind resistance when tested using, for example, a leaf blower to simulate high wind conditions.

The exterior surfaces of the side material preferably comprise a camouflage pattern 106, which may be any of a wide variety of camouflage patterns desired. The present inventor discovered that the side material preferably includes a camouflage exterior and an interior surface that is darkened or blackened in the areas near the troughs and valleys of the top edge so that visibility into the top portion of the blind is obscured.

Figure 2:
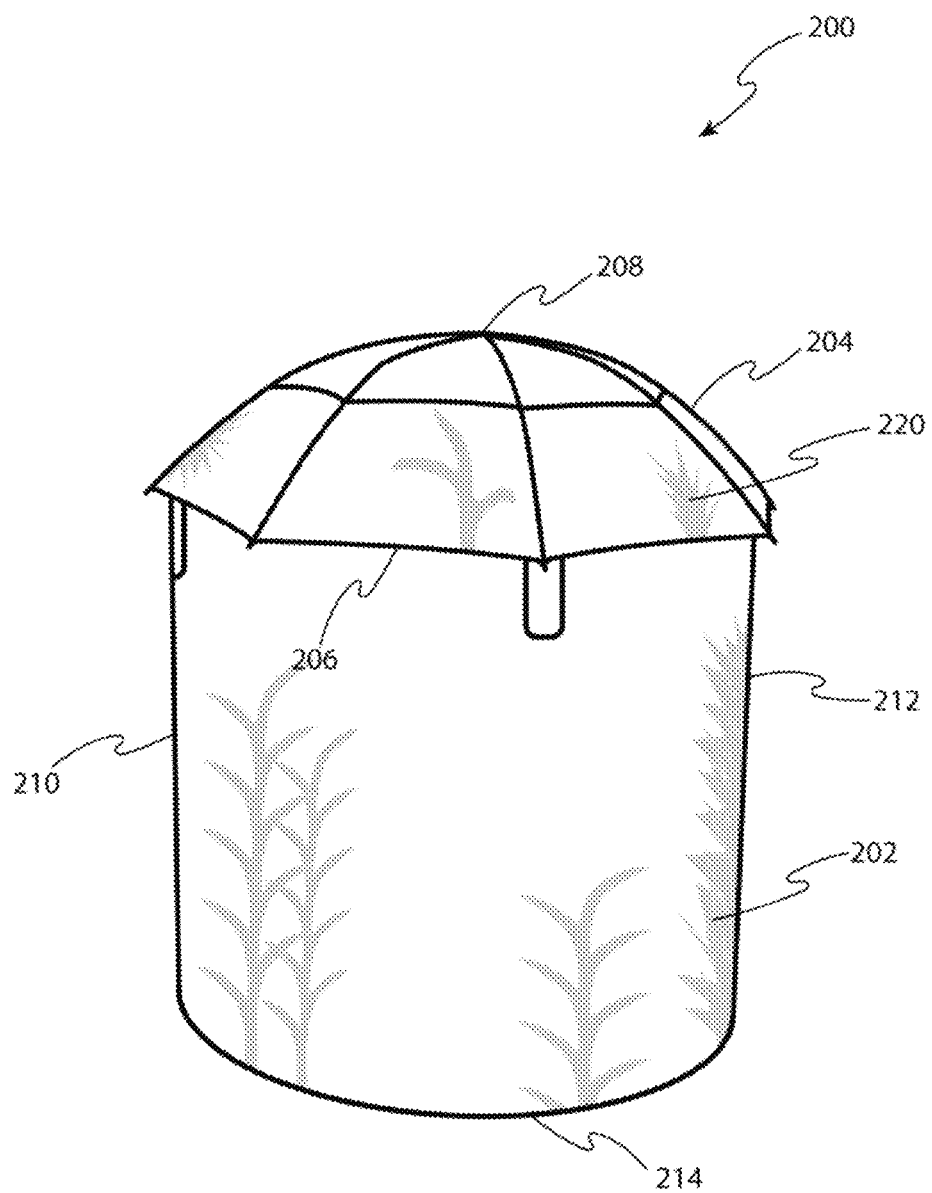
FIG. 2 is a perspective view of a portable hunting blind with optional cover, according to preferred embodiments.

FIG. 2 is a perspective view of a portable hunting blind 200 with optional cover 204, according to preferred embodiments. The blind 200 preferably comprises a cover 204, such as an umbrella with camouflage pattern 220, covering a blind such as blind 100 shown in FIG. 1. The blind side material in the blind 200 is shown with a different exterior surface camouflage pattern 202 and with different, less preferred top edge cutouts. The blind 200 is shown with an overall height from a bottom edge 214 to a top point 208 of the cover, and an overall width from one side 210 to the other side 212. The footprint of the blind 200, in the example shown in FIG. 2 is substantially circular, with the interior space created by the sides of the blind being substantially cylindrical.

Figure 3:
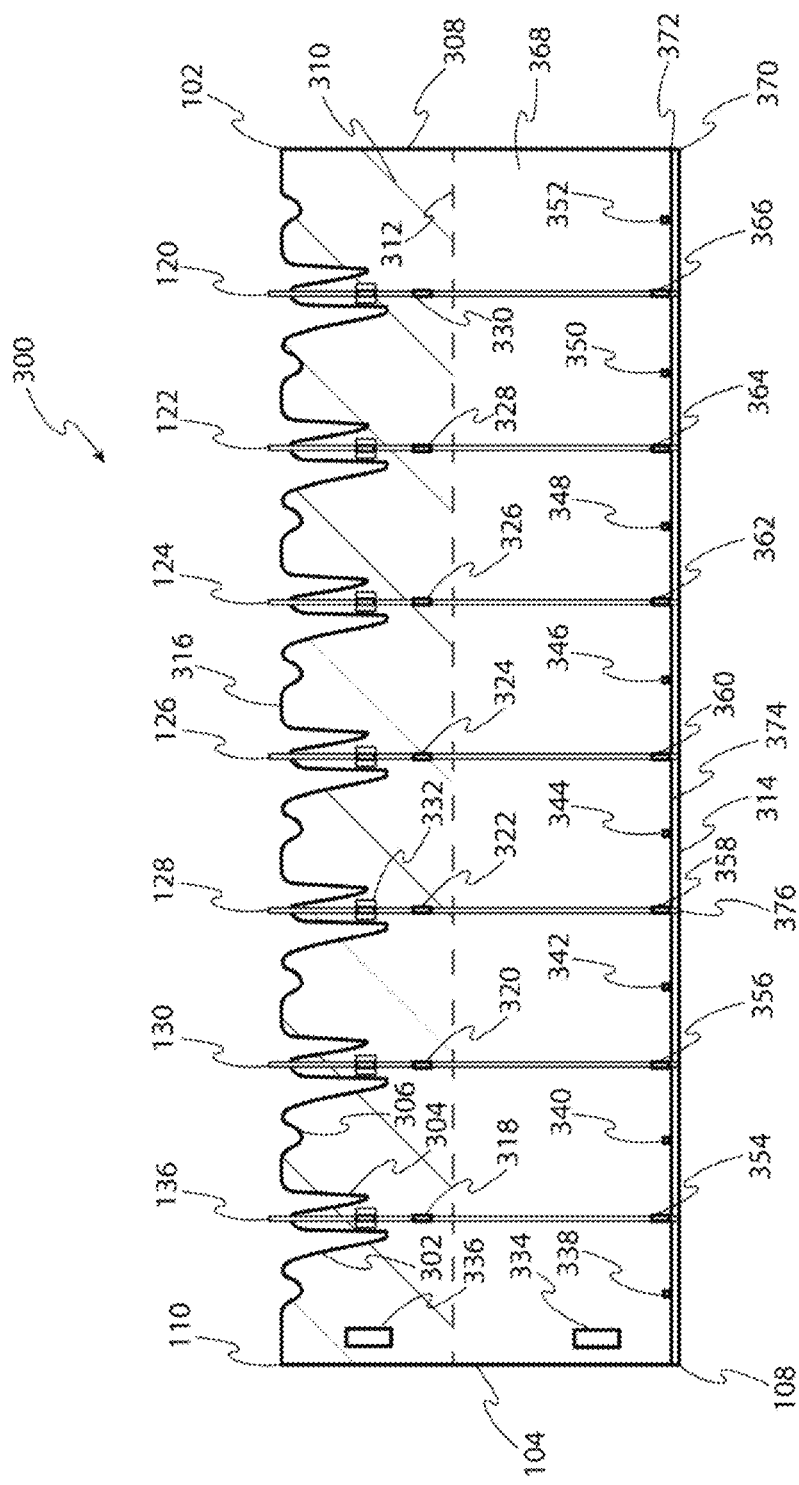
FIG. 3 depicts the interior side of the portable hunting blind shown in FIG. 1 when unrolled to show the side material in a flat orientation, according to preferred embodiments.

FIG. 3 depicts the interior side 300 of the portable hunting blind shown in FIG. 1 when unrolled to show the side material in a flat orientation, according to preferred embodiments. The side material is shown with a length 104-308 between a first edge 104 and a second lengthwise opposite edge 308. The height of the side material is 110-108 along edge 104 and 102-370 along edge 308. Preferred embodiments comprise a height 110-108 (102-370) of approximately 4 feet (or 48 inches less a two inch turned up lower edge, or approximately 46 inches). The length 104-308 is preferably approximately 12 feet. In other embodiments, a lower height 110-108 (102-370) is preferably lower to, for example, better accommodate a blind having viewing above the top edge at a height more typical for turkey hunting. In less preferred embodiments, the height and length dimensions of the side material may be different than shown and described.

The present inventor determined that darkening or blackening the upper portion of the interior side material, for example from a height 313 to the top 102, is preferred to improve the camouflage characteristics of the blind. The present inventor discovered that using a closed cell foam material with aluminum foil laminated on the inside surface 368 (or throughout the entire interior surface and then painted black above the height 312) provides thermal and other beneficial properties. The blind preferably comprises an aluminum foil interior surface for thermal reflectivity when a heat source is used within the interior space of the blind to provide heat for the hunter. The present inventor discovered that, unlike any other blinds available, side material comprising aluminum foil laminated closed cell foam provides wind resistance, moisture resistance, thermal insulation, heat reflectivity within the interior space of the blind, enough structural rigidity to work as a self-standing blind when adapted and configured as shown in FIG. 3 and set up as in FIG. 1, and enough flexibility and resilience to allow for repeatedly rolling up and unrolling the side material.

The interior side 300 preferably comprises a plurality of support rods 120, 122, 124, 126, 128, 130, and 136 such as the seven shown, each running through an upper tube 330, 328, 326, 324, 322, 320, and 318, respectively, and running through a lower tube 366, 364, 362, 360, 358, 356, and 354, respectively. All of the tubes (i.e upper tubes 330, 328, 326, 324, 322, 320, and 318, and lower tubes 366, 364, 362, 360, 358, 356, and 354) are preferably affixed or adhered permanently to the inside surface of the side material, substantially as shown. Each support rod is preferably able to run freely into and out of the aforementioned tubes, and each also preferably has a corresponding hook and loop type fastener such as the hook and look fastener patch 332 associated with support rod 128. As will be described in more detail with respect to FIG. 6, a piece of hook and loop type fastener wrapped around each rod is preferably used to grasp a corresponding patch of hook and loop fastener affixed to the interior side of the blind side material, as shown in FIG. 3. Each of the support rods may be released from a corresponding hook and loop patch fattener and pushed downward through a corresponding upper tube and simultaneously through a corresponding lower tube, to drive the lower end of the support rod into a ground or supporting surface beneath the lower edge 314 of the blind side material.

The interior side 300 preferably includes a plurality of additional stake down tubes (or anchor receptacles) 338, 340, 342, 344, 346, 348, 350, and 352 between each of the support rods. The number, size, shape, and spacing of the additional stake down tubes may be different. The stake down tubes are preferably permanently affixed to the interior side 300 as shown, and they are preferably sized to receive a standard tent stake (for example, a 9 inch aluminum stake).

The interior side 300 preferably includes a lower turned up edge 370-372 along the length 108-370 of the side material. The turned up edge 370-372 preferably comprises about 2 inches of side material turned up and permanently adhered to the interior surface. Preferably, the upper edge 374 of the turned up portion provides a lower boundary for each of the lower (support rod) tubes 366, 364, 362, 360, 358, 356, and 354 and stake down tubes 338, 340, 342, 344, 346, 348, 350, and 352. The inventor discovered that the turned up portion along the lower edge provides additional rigidity and structure to the overall blind construction, as shown in FIGS. 1 and 3.

Figure 4:
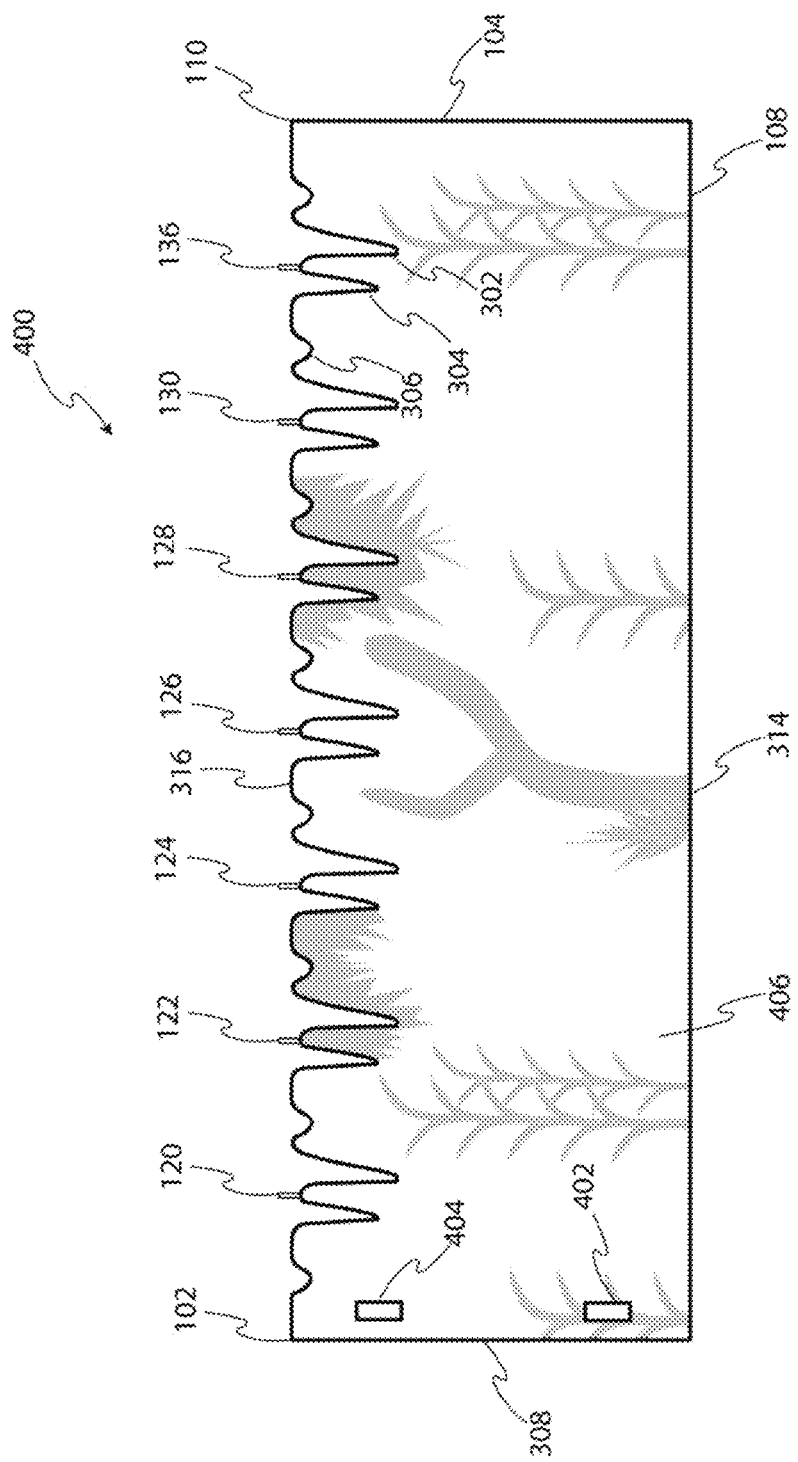
FIG. 4 depicts the exterior side of the portable hunting blind shown in FIG. 1 when unrolled to show the side material in a flat orientation, according to preferred embodiments.

FIG. 4 depicts the exterior side 400 of the portable hunting blind shown in FIG. 1 when unrolled to show the side material in a flat orientation, according to preferred embodiments. The exterior side 400 is the opposite side of the interior side 300, and cutout troughs/valleys 302, 304, 306 and top edge peak 316 are provides for reference to those features between FIGS. 3 and 4, and for reference of support rod 128 as described in greater detail with respect to FIGS. 6, 7, and 8. The exterior surface 406 preferably comprises a camouflage pattern surface. In preferred embodiments, an upper hook and loop fastener 404 and a lower hook and loop fastener 402 are affixed to the exterior surface 406 to be aligned with correspondingly mating hook and loop fasteners 336 and 334 on the interior surface 300 shown in FIG. 3.

Figure 5:
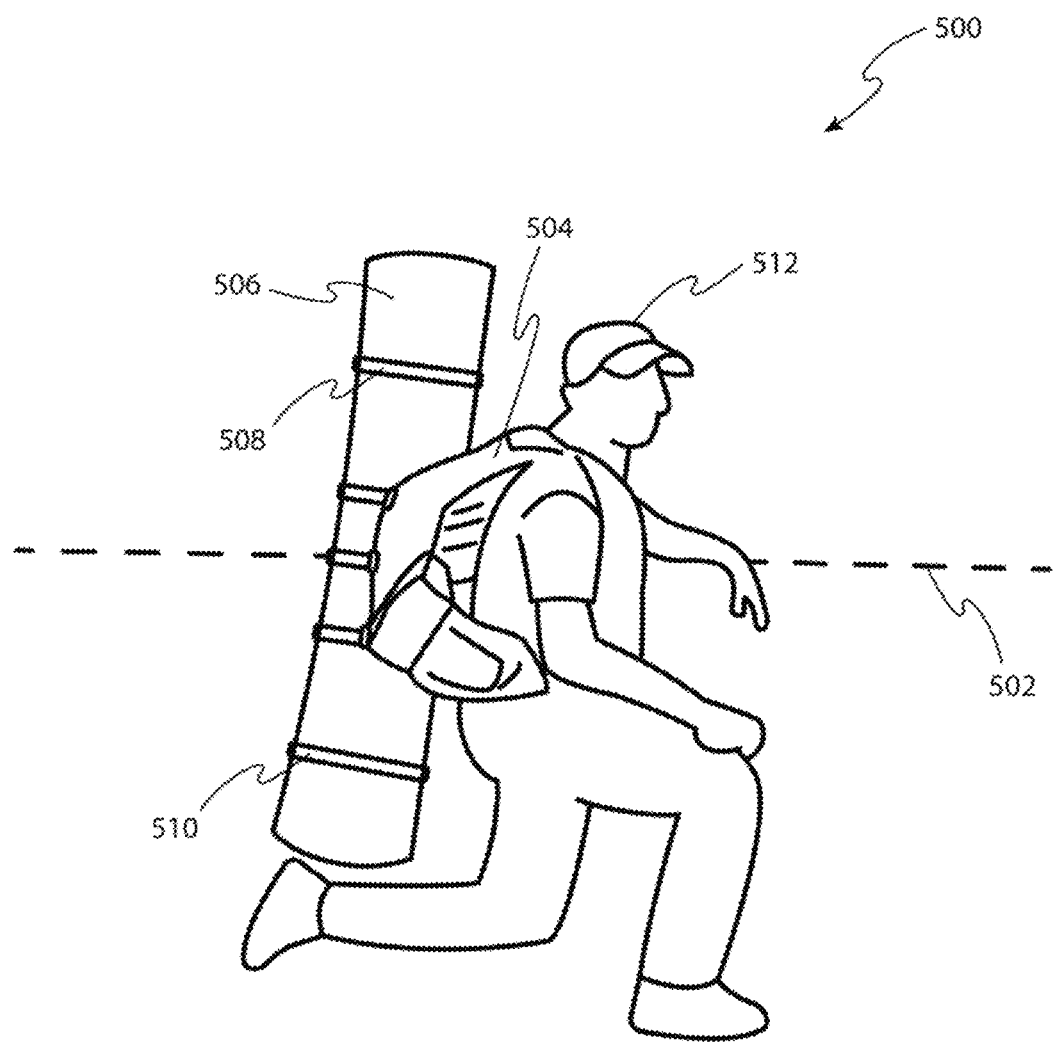
FIG. 5 is an illustration showing the portable hunting blind shown in FIG. 1 rolled up and attached to a backpack, according to preferred embodiments.

FIG. 5 is an illustration 500 showing the portable hunting blind 506 shown in FIG. 1 rolled up and attached to a backpack, according to preferred embodiments. As shown, the blind 100 preferably comprises side material that can be rolled up. Straps 508 and 510 may be used to hold the rolled up blind 506 in a roll. Straps integral to backpack 504 may be used to attach the rolled up blind 506 to the backpack 504. And hunter 512, shown leaning on a surface 502, may then easily carry the collapsed, rolled up blind 506 from location to location. The rolled up blind 506 includes the side material and supporting rods shown in FIGS. 3 and 4, and preferably weighs approximately 4 lbs. The optional cover 204 shown in FIG. 2 and a number of additional securing stakes may also be included in the rolled up blind 506.

Figure 6:
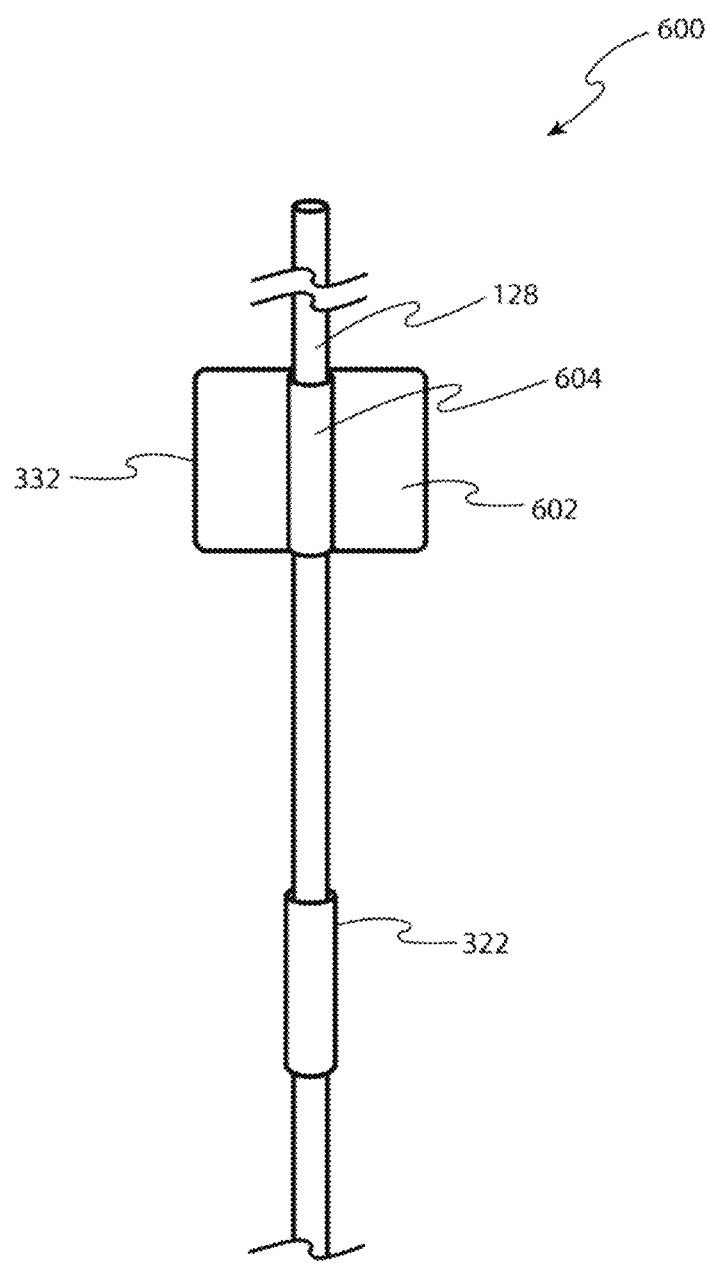
FIG. 6 is an illustration of an upper portion of a rod component of the portable hunting blind in FIG. 1, according to preferred embodiments.

FIG. 6 is an illustration 600 of an upper portion of a rod component of the portable hunting blind in FIG. 1, according to preferred embodiments. The support rod 128 preferably includes a wrap 604 of hook and loop fastener that fastenably secures with a patch 602 of hook and loop fastener adhered to the inside surface of the interior side 300, as shown in FIG. 3. The support rod 128, in preferred embodiments, is slideably and removably retained by the upper tube 322 (and, shown in FIG. 7, the lower tube 358).

Figure 7:
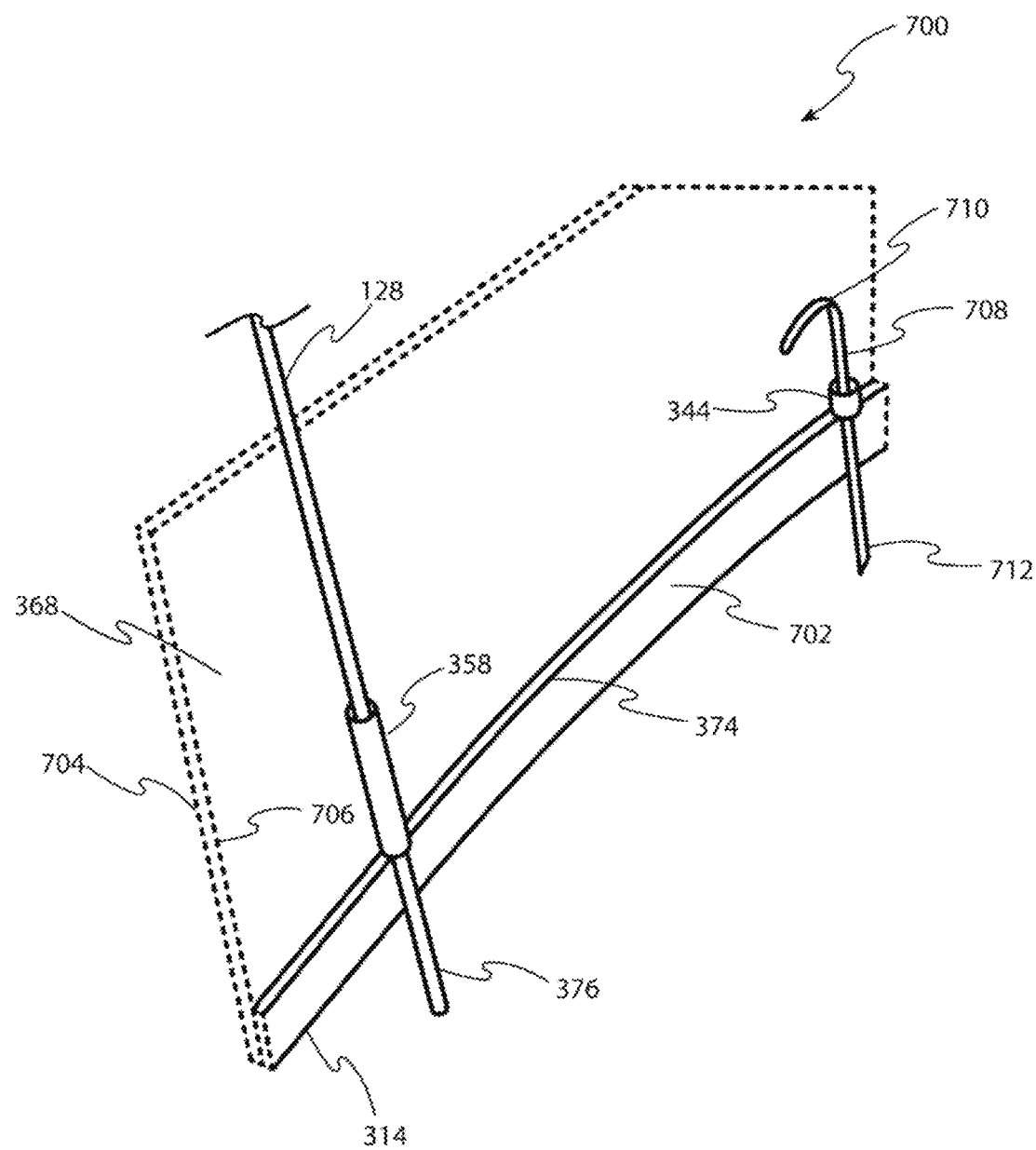
FIG. 7 is an illustration of a lower portion of an interior side of the portable hunting blind in FIG. 1, according to preferred embodiments.

FIG. 7 is an illustration 700 of a lower portion of an interior side of the portable hunting blind in FIG. 1, according to preferred embodiments. When the support rod 128 is moved downward (by detaching/unfastening the wrap 604 hook and loop fastener from its corresponding patch 602), the lower end 376 of the rod 128 extends downward below the lower edge 314 of the blind. As previously described, the lower tube 358 is preferably adhered to the interior surface 368 and positioned just above the upper edge 374 of the turned up edge 702. Also as previously described, the stake down tube 344 is preferably adhered to the interior surface 368 and positioned just above the upper edge 374 of the turned up edge 702. A stake 710 (such as a 9 inch aluminum tent stake) is preferably used, as shown, to secure the lower edge of the blind by driving the stake 710 through the stake down tube 344 so that the stake's lower end 712 is driven downward below the lower edge 314 of the blind.

Figure 8:
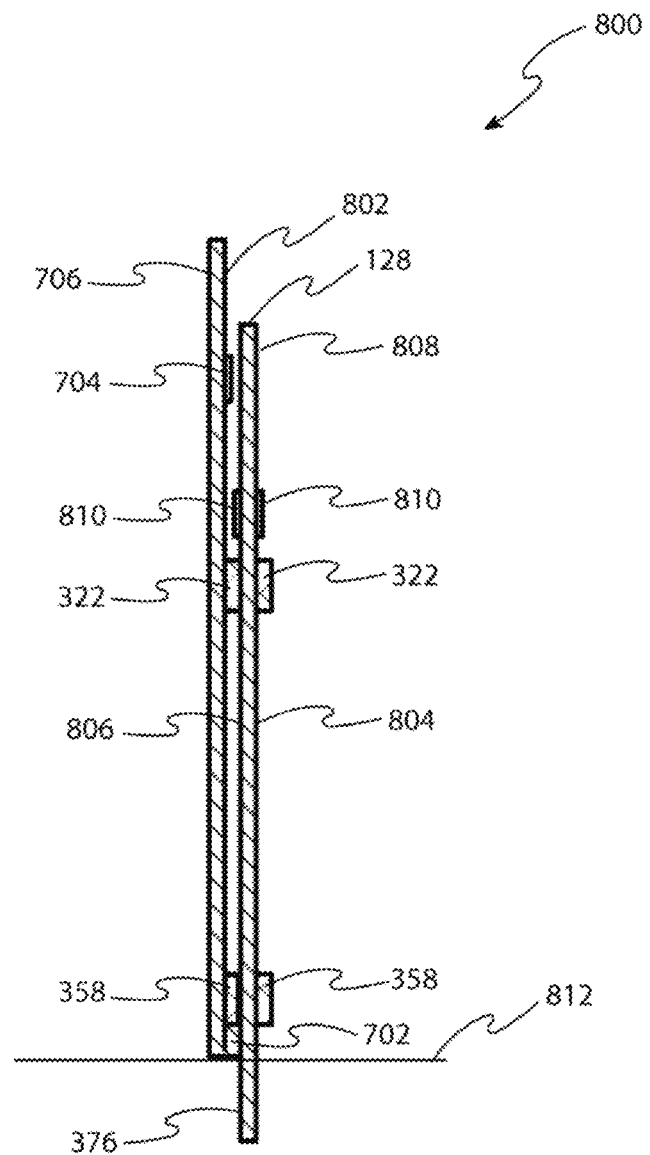
FIG. 8 is a cross-section through a side material and rod component of the portable hunting blind in FIG. 1, according to preferred embodiments.

FIG. 8 is a cross-section 800 through a side material 802 and rod 128 component of the portable hunting blind in FIG. 1, according to preferred embodiments. The thickness 704-706 of the side material 802 is preferably consistent throughout, and the thickness of the turned up portion 702 is preferably the same thickness 704-706. As shown, the support rod 128 in a downward position 808 with its wrap of hook and loop fastener 810 detached from a corresponding patch of hook and loop fastener 602 so that the rod 128 has been slid downward through upper tube 322 and lower tube 358 and the lower end of the rod 376 is shown penetrating the ground/surface level 812. The support rod 128 preferably comprises a rod substantially the length that is the same as the height 108-110 of the side material 802 and a thickness/diameter 804-806 of about ¼ to ⁵⁄₁₆ inch. Each rod is preferably comprised of fiberglass, for strength and durability.

The present inventor discovered that the side material 802 preferably comprises a 5 mm think aluminum foil EPE closed cell foam construction. In other embodiments, the thickness 704-706 of side material 802 is preferably between 2 mm and 10 mm. In other embodiments, the side material 802 may comprise EPE closed cell foam (for better thermal insulating properties) or EVA (ethylene vinyl acetate) (for better durability) or EPP (expanded polypropylene). In some embodiments, the side material 802 may comprise EPE closed cell foam with aluminum foil laminated on both interior and exterior sides (with the exterior coated with a camouflage pattern and the interior upper portion coated with a dark or black color).

Figure 9:
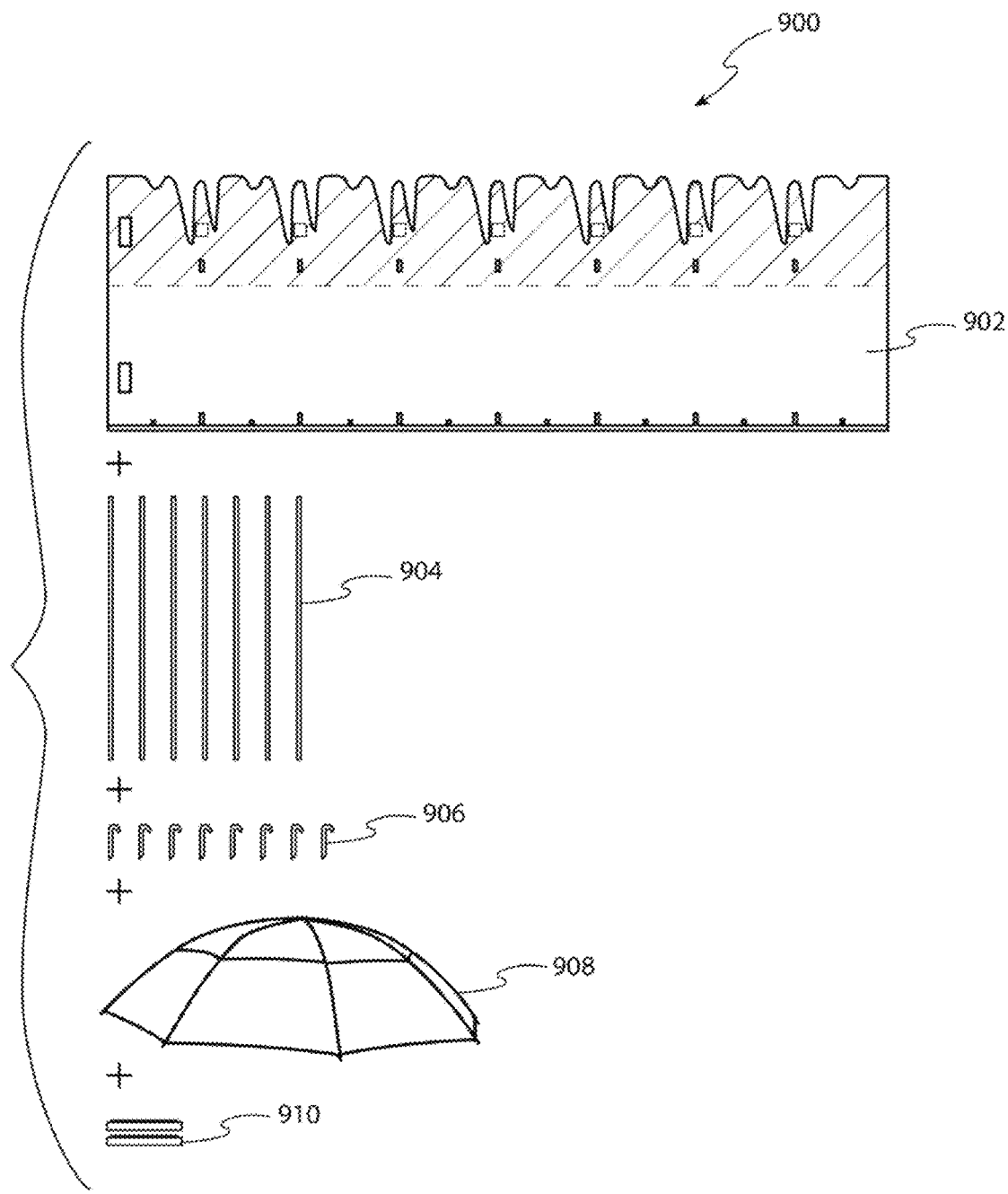
FIG. 9 illustrates a kit of components comprising a portable hunting blind, according to preferred embodiments.

FIG. 9 illustrates a kit of components 900 comprising a portable hunting blind, according to preferred embodiments. The kit preferably includes a side material component 902 comprising the interior and exterior side in FIGS. 3 and 4 without the supporting rods 128 in place; plus a plurality of support rods 904; plus a plurality of stakes 906; plus an optional cover or umbrella 908; and optionally a pair of straps 910 for securing the blind when rolled up. In a preferred embodiment, the kit 900 comprises a side material component 902, seven support rods 904, and eight stakes 906. In another embodiment, the kit 900 comprises a side material component 902, seven support rods 904, eight stakes 906, a cover 908, and two straps 910.

Figure 10:
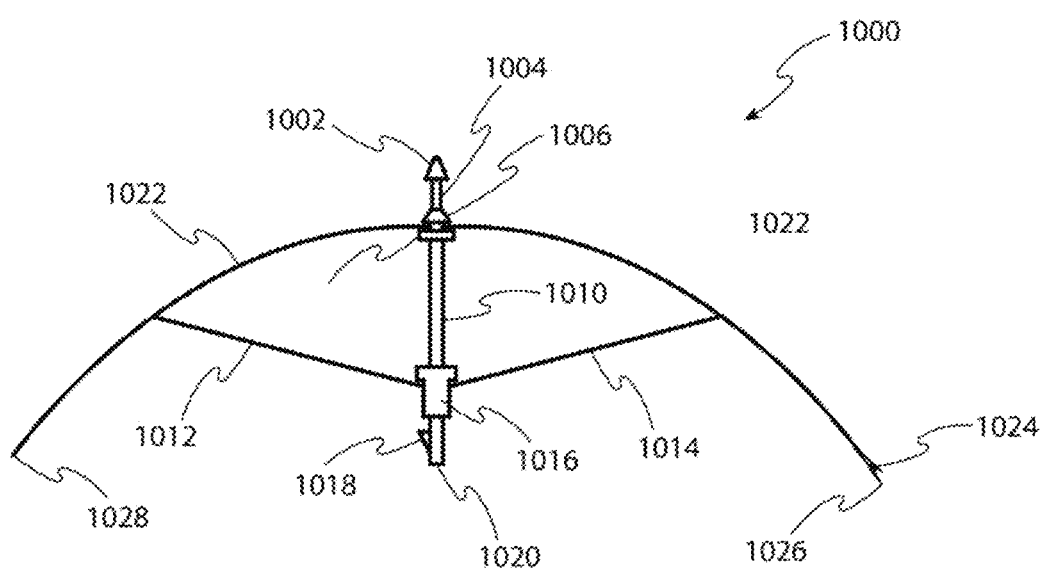
FIG. 10 depicts a cross-section of an optional cover for a portable hunting blind, according to preferred embodiments.

FIG. 10 depicts a cross-section of an optional cover 1000 for a portable hunting blind, according to preferred embodiments. The cover 1000 preferably comprises a modified umbrella having a camouflage pattern 1022 thereon. As shown, a cover 1000 may comprise an umbrella with a cut off shaft 1020. Depressing the spring 1018 allows the runner 1016 to slide off the cut end of the shaft 1020 opposite the tube 1010, whereby the stretchers 1012 and 1014 follow the runner downward to fold the covering material (with camouflage pattern) 1022 downward into a collapsed and stowable configuration, similar in size with an unmodified collapsed umbrella. The cap 1006, end 1004, and ferrule 1002 components are shown for reference to similar components of an umbrella. In preferred embodiments, tips 1028 and 1026 may include a clip 1024 for holding the tip of the cover to a top edge of the blind, such as to top edge 316 shown in FIGS. 3 and 4. In preferred embodiments comprising a cover such as cover 1000, three clips such as clip 1024 are equally spaced (at 120 apart from one another) around the cover for securing a lower edge or tip of the cover to an upper edge of the blind side material.

Figure 11:
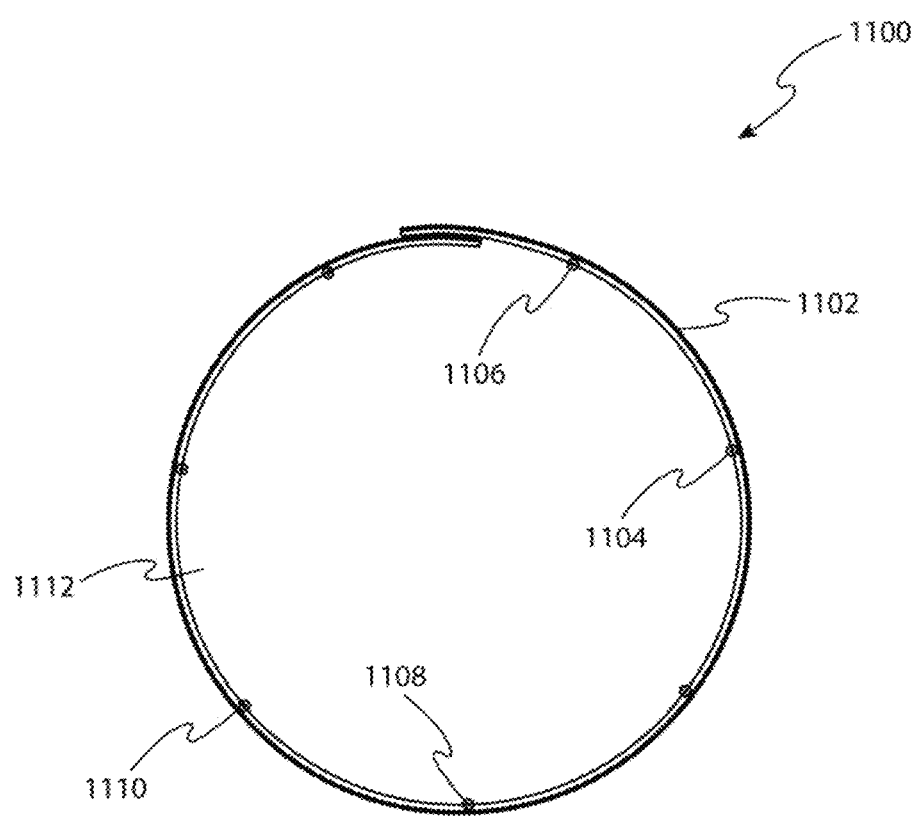
FIG. 11 is an overhead view of an assembled substantially circular configuration of a portable hunting blind, according to preferred embodiments.
Figure 12:
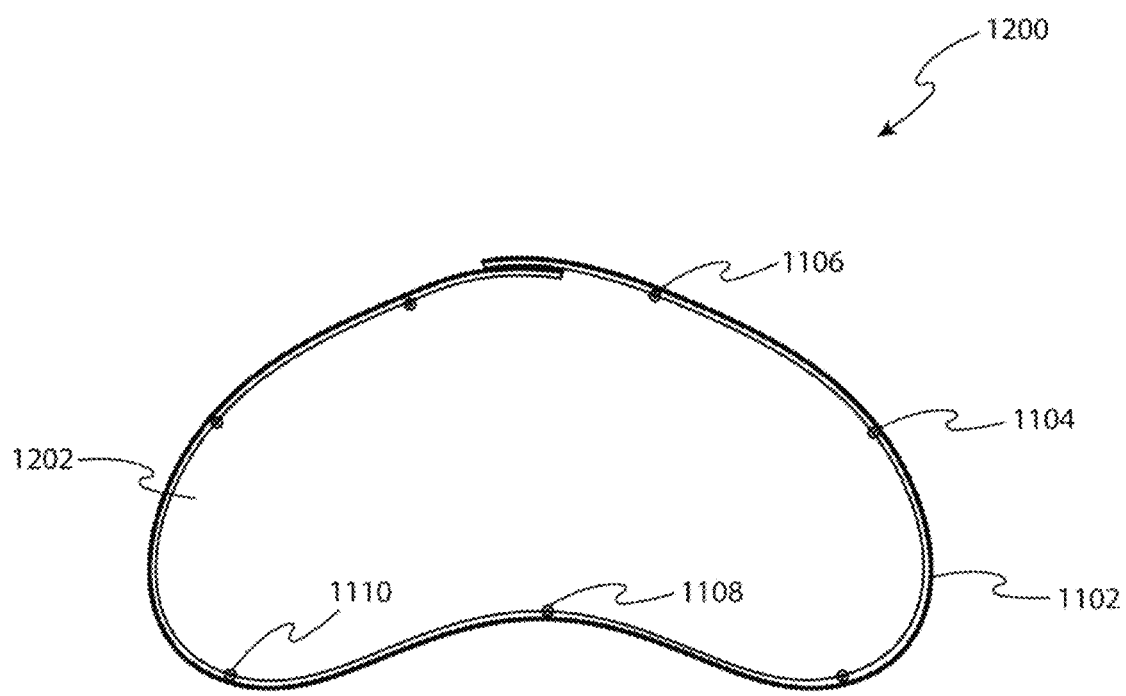
FIG. 12 is an overhead view of an assembled irregularly shaped configuration of a portable hunting blind, according to preferred embodiments.

FIG. 11 is an overhead view of an assembled substantially circular configuration 1100 of a portable hunting blind without a cover, according to preferred embodiments. The side material shown in FIG. 1 may be configured substantially as shown in FIG. 11 so that the side material is oriented in a circle, creating a circular area 1112 enclosed by the side material 1102. Particular support rods 1106, 1104, 1108, and 1110 are shown for reference and comparison with respect to FIG. 12, which is an overhead view of an assembled irregularly shaped configuration 1200 of a portable hunting blind, according to preferred embodiments. The support rods are shown repositioned from where they were in FIG. 11 so as to create an irregular interior area 1202 that is different than the area 1112. The blind side material 1102 is preferably reconfigurable into any shape, so that the blind may be oriented to accommodate a desired interior footprint or avoid a particular obstacle or obstruction such as a tree or rock or particular vegetation.

Figure 13:
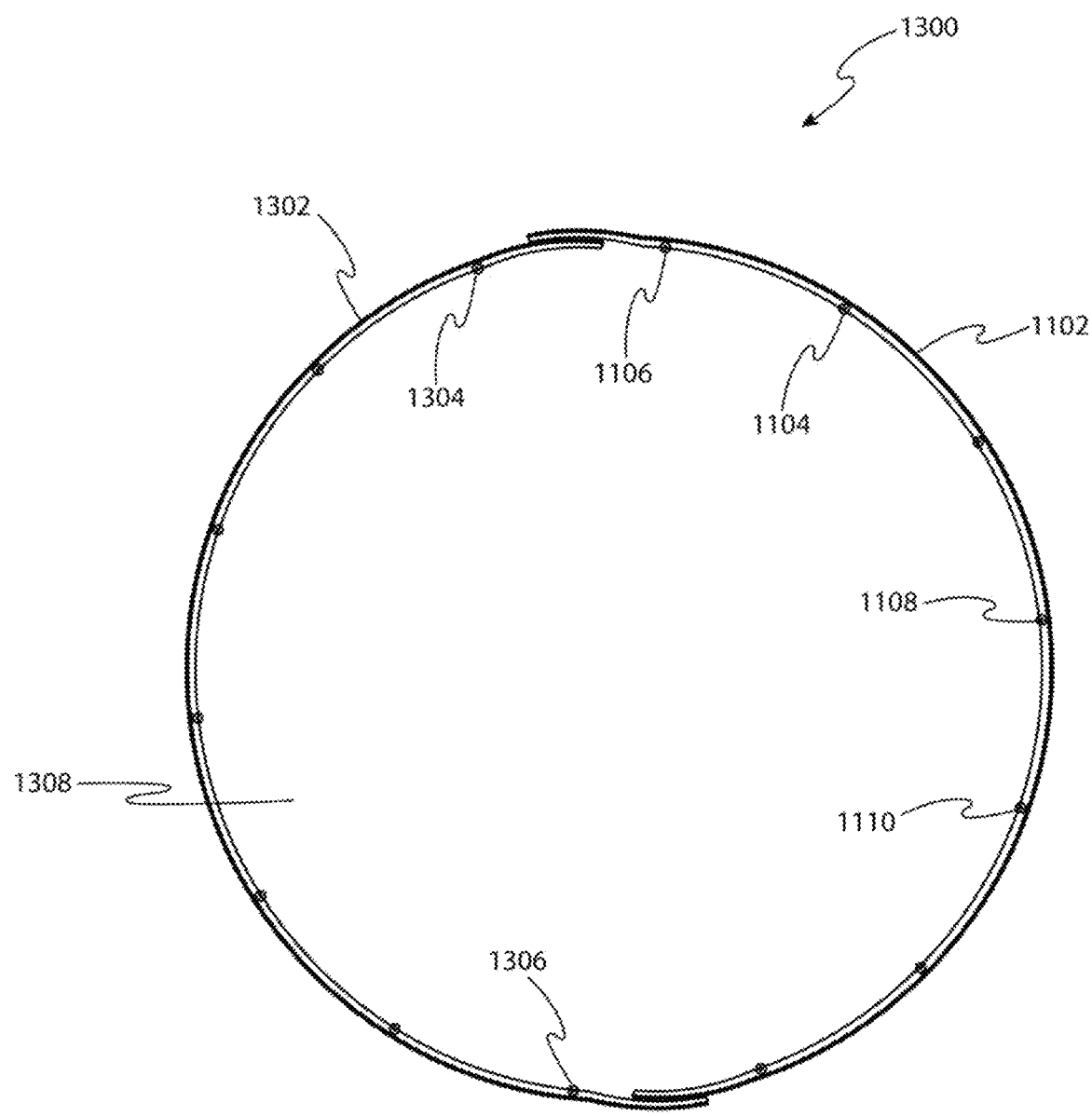
FIG. 13 is an overhead view of two blinds interconnected with one another in an assembled substantially circular configuration, according to preferred embodiments.
Figure 14:
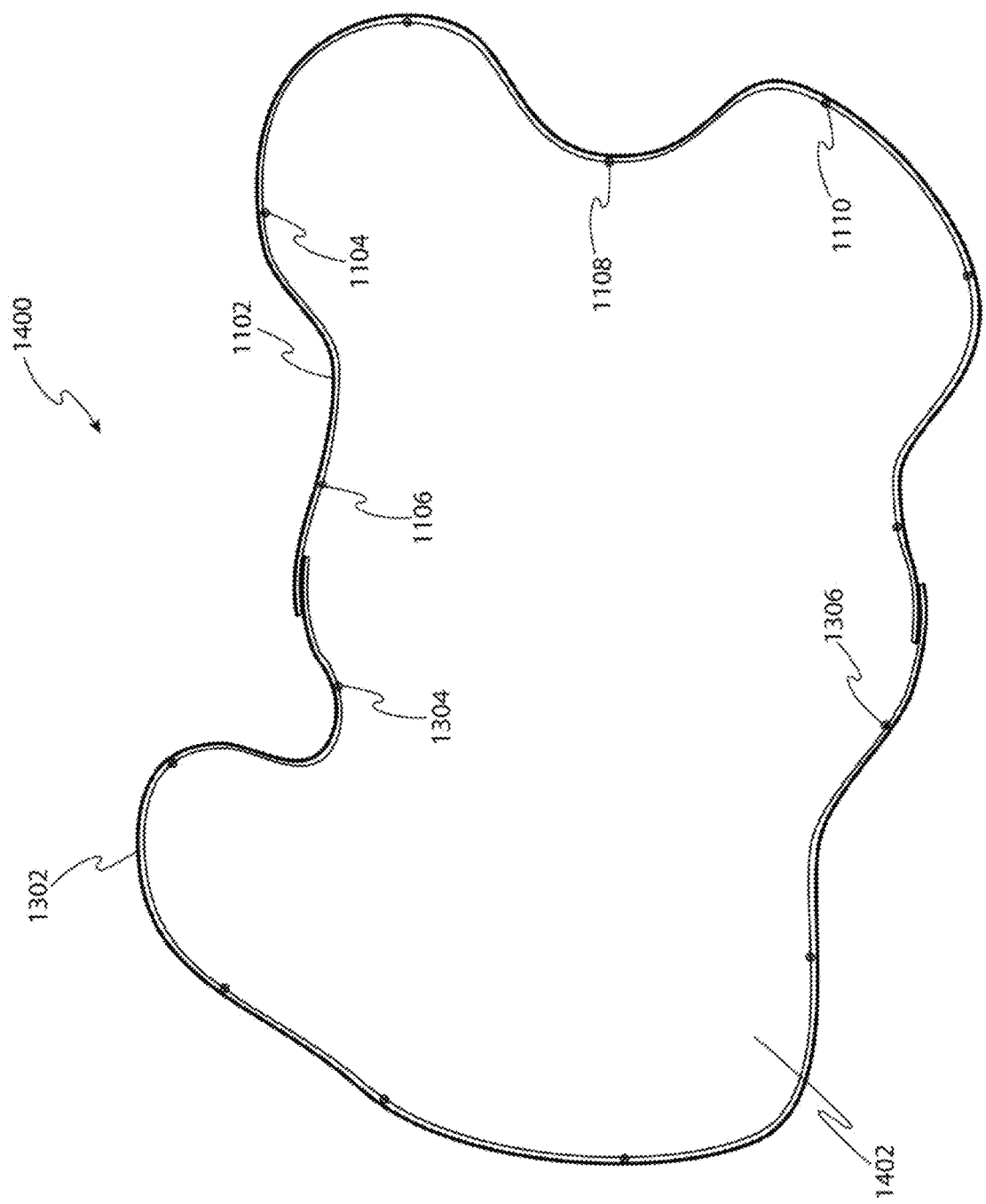
FIG. 14 is an overhead view of two blinds interconnected with one another in an assembled irregularly shaped configuration, according to preferred embodiments.

FIG. 13 is an overhead view of two blinds interconnected with one another in an assembled substantially circular configuration 1300, according to preferred embodiments. Side material 1102 of a first blind is shown interconnected with the side material 1302 of a second blind (such as by using the loop and hook fasteners of one blind 1102 with correspondingly mating loop and hook fasteners of the second blind 1302). A circular interior space 1308 is created by arranging both blinds connected together into a large circle. And the support rods 1106, 1104, 1108, 1110, 1306, and 1304 are shown for reference and comparison with respect to FIG. 14, which is an overhead view of two blinds interconnected with one another in an assembled irregularly shaped configuration 1400, according to preferred embodiments. The support rods are shown repositioned from where they were in FIG. 13 so as to create an irregular interior area 1402 that is different than the area 1308. The blind side material 1102 and 1302 of the two blinds may be combined and oriented to accommodate a desired footprint or to avoid particular obstacles or environmental condition such as rocks or water or changes in slope.

In preferred embodiments, using the described portable hunting blind comprises unrolling the sheet of semi-rigid side material, arranging the side material in an upright orientation upon the ground or surface underneath to form a closed shape suitable for concealing a hunter within an interior space surrounded by said side material, and pushing downward at least one of the plurality of rod supports which are adapted to support the semi-rigid side material to anchor the side material to the surface underneath. The ends of the of the side material may further be secured using fasteners incorporated into correspondingly mating ends of said side material (such as the hook and loop fasteners, or alternative fastening means), and using one or more stakes to further secure the lower turned up edge of said side material.

To tear down and stow the blind or carry the blind to another location, the hunter preferably pulls upward the rod supports anchoring the side material to the ground underneath, rearranges the side material to lay flat on the ground, and then rolls up the sheet of side material along with the rod supports, and also the optional additional stakes and optional cover/umbrella, into a roll, and uses a couple of straps to secure the rolled up blind.

Figure 15:
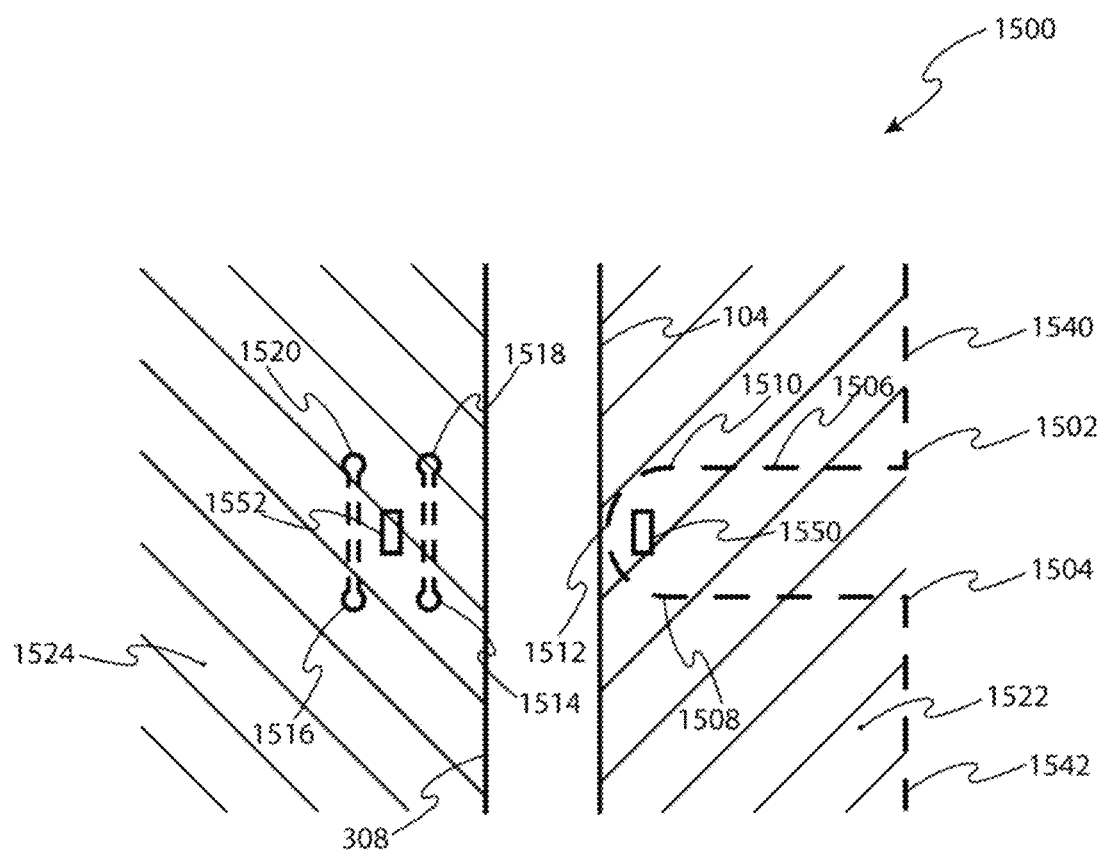
FIG. 15 depicts a strap and corresponding slots for connected ends of a portable hunting blind, according to preferred embodiments.

FIG. 15 depicts a strap 1506 and corresponding slots 1518-1514 and 1520-1516 for connected ends 308 and 104 of a portable hunting blind, according to preferred embodiments. The present inventor discovered alternatives to closing the blind 100 (or securing the two ends of the blind 100, or interconnecting the ends of a first blind with the ends of a second blind) using other than the loop and hook fasteners 336, 338 (in FIG. 3) and 404, 402 (in FIG. 4) preferably include cutting a strap 1506 from an end 104 of the blind and cutting slots 1518-1514 and 1520-1516 into the end 308 of the blind. Each slot is preferably bounded by a hole. For example, the slot 1520-1516 is preferably created by forming a 5/16 inch hole at 1520 and another 5/16 inch hole at 1518, and connected the two with a 1/8 inch wide channel. The slot 1518-1514 is preferably formed in the same manner.

The strap 1506 preferably comprises cutting along 1540 to a point 1502, and similarly cutting along 1542 to a point 1504; then cutting to a radius starting at 1508 and ending at 1512; and likewise cutting from 1502 to a radius starting at 1510 and ending at 1512. Hook and loop fasteners 1550 and 1552 are preferably positioned and adhered to the interior side material surfaces 1522 and 1524 as shown. The resulting strap 1506 is preferably about three inches wide to match the approximate lengths of slots 1518-1514 and 1520-1516. The slots are preferably three inches apart from one another (i.e. 1516-1514 and 1520-15-18 are each about three inches), and the strap 1506 is preferably long enough to thread through the two slots and fold over so that the hook and loop fasteners 1550 and 1552 can be connected with one another.

Figure 16:
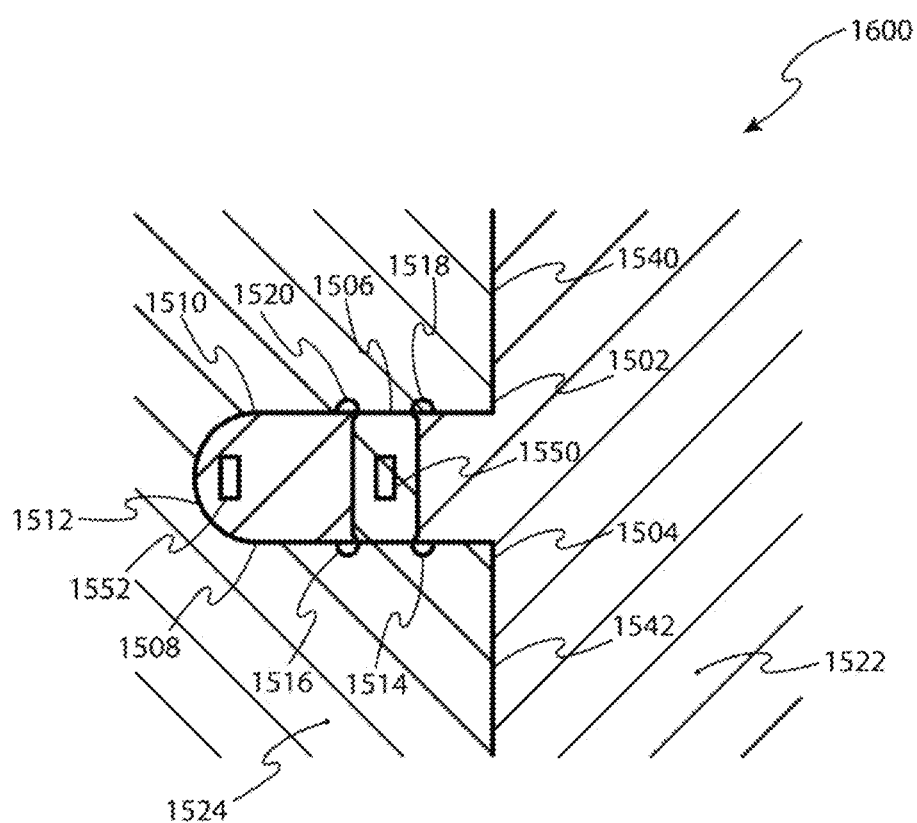
FIG. 16 depicts the strap and corresponding slots shown in FIG. 15 in a closed orientation, according to preferred embodiments.

FIG. 16 depicts the strap 1506 and corresponding slots shown in FIG. 15 in a closed orientation with the end of the strap 1506 not yet folded over to connect the fastener 1552 (on the end of the strap 1506 on material surface 1522) with the fastener 1550 (between the two slots on material surface 1524), according to preferred embodiments. In some embodiments, more than one strap 1506 may be used on end 104 of the blind, along with more than one set of corresponding slots in the other end 308.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A portable hunting blind comprising:
   semi-rigid side material having a height and a length, said side material adapted to be supported in an upright orientation upon a surface underneath by a plurality of rod supports, and said side material sized and adapted to be positionable to form a closed shape upon said surface, said closed shape for concealing a hunter within an interior space surrounded by said side material;
   a top edge of said side material formed to include troughs of varying depth and shape to provide an improved camouflage characteristic for said top edge of said side material, said troughs adapted to provide support for resting the barrel of a gun; and
   a plurality of anchor receptacles through which tent stakes may be used to secure a bottom edge of said side material.

2. The hunting blind of claim 1 wherein said side material comprises semi-rigid resilient material adapted to be cuttable by hand using a knife, with the areas cut by said knife being resistant to ripping, for permitting modification of said troughs by said hunter and for permitting said hunter to add through-holes in said side material.

3. The hunting blind of claim 1 wherein said blind is sized to accommodate within said interior space said hunter with a chair and room for a source of heat and a deodorizer device.

4. The hunting blind of claim 1 wherein said side material comprises sheet material having an approximate height of four feet and a length of approximately twelve feet.

5. The hunting blind of claim 1 wherein said side material and rod supports are adapted to roll up into a collapsed secured roll for carrying by said hunter.

6. The hunting blind of claim 1 wherein said blind weighs approximately four pounds.

7. The hunting blind of claim 1 wherein said blind comprises a first blind, and further comprising a second blind as in claim 1, wherein the second blind is interconnectable with the first blind, with a combination of said first and said second blinds positionable to form a larger closed shape within the interior space surrounded by the side material of the interconnected first and second blinds.

8. The hunting blind of claim 1 wherein each of said rod supports is adapted to be selectively adjustable downward to stake into said surface beneath said blind for staking said blind into said surface.

9. The hunting blind of claim 1 further comprising an optional cover for rain protection and added camouflage from above said side material.

10. The hunting blind of claim 1 wherein said side material comprises a closed cell foam.

11. The hunting blind of claim 10 wherein said closed cell foam comprises an EPE foam.

12. The hunting blind of claim 10 wherein said side material has a thickness of between approximately 2 mm and 10 mm.

13. The hunting blind of claim 10 wherein said interior surface of said closed cell foam used for said side material comprises an aluminum foil laminate.

14. The hunting blind of claim 1 wherein said side material includes fasteners adapted to permit securably fastening ends of said side material to form said closed shape.

15. A method of using a hunting blind comprising:
   unrolling a sheet of semi-rigid side material having a height and a length, the semi-rigid side material further having a top edge running the length of the side material formed to include troughs of varying depth and shape to provide an improved camouflage characteristic for said top edge of said side material, said troughs adapted to provide support for resting the barrel of a gun;
   arranging said side material in an upright orientation upon a surface underneath, to form a closed shape suitable for concealing a hunter within an interior space surrounded by said side material; and
   pushing downward at least one of a plurality of rod supports adapted to support said semi-rigid side material to anchor said side material to said surface underneath.

16. The method of claim 15 further comprising:
   securing the ends of said side material using fasteners incorporated into correspondingly mating ends of said side material; and
   using one or more stakes to further secure a lower turned up edge of said side material.

17. The method of claim 15 further comprising:
pulling upward the at least one of said plurality of rod supports anchoring said side material to said surface underneath;
re-arranging said side material to lay flat on said surface; and
rolling the sheet of semi-rigid side material along with said plurality of rod supports into a roll for portable carriage by said hunter.

18. A kit of components for a portable hunting blind comprising:
a rollable sheet of semi-rigid closed cell foam side material having a height and a length, the semi-rigid side material having a top edge running the length of the side material formed to include troughs of varying depth and shape to provide an improved camouflage characteristic for said top edge of said side material, said troughs adapted to provide support for resting the barrel of a gun;
a plurality of rod supports adapted to support said semi-rigid side material to anchor said side material to a surface underneath said side material when said side material is arranged in an upright orientation upon said surface.

19. The kit of claim 18 further comprising a plurality of stakes for anchoring a turned up lower edge of said side material, a cover adapted to fit over an interior space created by said side material when said side material is arranged in an upright orientation upon a surface underneath to form a closed shape suitable for concealing a hunter within said interior space surrounded by said side material, and one or more straps for securing said sheet in a rolled up orientation.

* * * * *